Patented Mar. 10, 1942

2,275,979

UNITED STATES PATENT OFFICE 2,275,979

SODIUM PERBORATE PREPARATION

Nicholas M. Molnar, New York, N. Y.

No Drawing. Application November 29, 1938,
Serial No. 243,031

4 Claims. (Cl. 167—72)

This invention relates to rapid liberation of oxygen at controlled pH's for hygienic purposes.

One object of this invention is to provide a material which will liberate oxygen by mixing the dry powder with a small quantity of water; the amount of oxygen that is being liberated per unit time being many times greater than that being liberated by mixtures at present offered on the market particularly when warm or lukewarm water is used which is customary with oral and other hygienic use. There are a number of preparations on the market at the present time which are neither more nor less than flavored sodium perborates with possible admixture of inert material. Sodium perborate when mixed with water liberates oxygen very slowly and only that part of the sodium perborate from which oxygen is being liberated is effective from the hygienic point of view. The solubility of tetrahydrated sodium perborate is very slight and only the small amount of sodium perborate that goes into solution liberates oxygen. The resultant mixture will therefore be sodium borate—which is very soluble—gaseous oxygen, water and unaffected sodium perborate; whereas in my mixtures, because of the acceleration in the rate of liberation of oxygen, sodium borate is rapidly formed from the sodium perborate dissolved, thereby shifting the equilibrium to the right and producing more of the soluble sodium borate and larger quantities of gaseous oxygen per unit time.

I have provided in my compound the means whereby the speed of solution of sodium perborate is increased by the catalytic action of one of the group consisting of sodium and potassium iodide, and a salt of bromine with acidic substances or combination of them, potassium iodide being preferred.

A characteristic of this invention is to produce a mixture which will have a considerably lower pH than that of pure sodium perborate. It is a known fact that the value of sodium perborate for hygienic purposes is considerably reduced by reason of its high pH, the mucous membrane being adversely affected. By virtue of the fact that I can liberate with my mixture a greater amount of oxygen than can be liberated with the same amount of sodium perborate, I can admix with the sodium perborate other substances, besides the catalyst, which are beneficial for hygienic purposes and which at the same time will have a tendency to bring the pH within the correct range.

Another object of the invention is to provide a hygienically important and useful material which, per unit weight, has a greater oxygen liberating quality per unit time and as these solutions are in contact with the body cavities such as the mouth or vagina, for a short length of time only, the increased quantity of oxygen liberated in a given time is important. I have provided for that.

Another object of my invention is to provide the means whereby liberation of oxygen from the sodium perborate mixtures may be controlled to any desired rate. Thus, by limiting the amount of potassium iodide in the mixture to 0.1%, the liberation of oxygen, when the powder is mixed with water, will be maintained over a period of 12 hours, whereas, when the amounts of potassium iodide in the mixtures are increased as shown in the examples below, the powders will, when mixed with water, yield oxygen very rapidly at the start and then at a slowly decreasing rate so that a graph of the volume of oxygen liberated against time will show a slowly sloping curve approaching an almost horizontal line after 75 minutes. The pH also has some bearing on the rate of liberation of oxygen as shown by the data for various mixtures given below. Other materials may be mixed into my composition besides sodium or potassium iodide in order to decrease the pH and, in addition, to produce other beneficial effects, suitable materials being sodium chloride C. P. or common table salt, potassium chloride, sodium bicarbonate, citric acid, tartaric acid, sodium bitartrate, and acidic salts of citric acid. These materials may be used alone or in combination, but they should, preferably, be anhydrous. Of course, all of these mixtures may be flavored or colored to make them more desirable commercial products without deviating from the spirit of this invention. Herewith I append a number of formulae that may be used commercially, without however limiting this invention to the actual preparations given in these formulae.

TABLE No. I

*Examples*

|  | Mixtures in grams | | | | | |
|---|---|---|---|---|---|---|
|  | 1 | 2 | 3 | 4 | 5 | 6 |
| NaCl (sodium chloride) | 20 | 39 | 30 | 20 | 42 | |
| KI (potassium iodide) | 3 | 3 | 1 | 2 | | 3 |
| NaHCO₃ (sodium bicarbonate) | 39 | | | 28 | | 40 |
| NaBO₃.H₂O (sodium perborate monohydrated) | 38 | 38 | 69 | 50 | 39 | 57 |
| HO·C·COOH<br>  CH₂·COOH (citric acid) | | 20 | | | 19 | |

TABLE No. II

*Findings on examples and on untreated perborate*

(a) pH of 2 percent solution.
(b) C. c. oxygen liberated by 2 g. in 5 minutes.
(c) C. c. oxygen liberated in 10 minutes.
(d) Remarks.

| | Sod. perb. H$_2$O | Sod. perb. 4H$_2$O | Table No. 1 examples marked as— | | | | | |
|---|---|---|---|---|---|---|---|---|
| | | | 1 | 2 | 3 | 4 | 5 | 6 |
| (a) | 10.0 | 10.0 | 9.4 | 8.8 | 8.8 | 9.6 | 8.2 | 9.4 |
| (b) | No action | 0.2 c. c. | 9.0 | 12.0 | 1.8 | 4.9 | 0.5 | 8.0 |
| (c) | do | 0.2 c. c. | 13.5 | 19.0 | 7.0 | 8.8 | 1.0 | 14.0 |
| (d) | Practically none dissolved. | Practically none dissolved. | Small amount of solid left. | Almost all dissolved. | Small amount of solid left. | Small amount of solid left. | Some dissolved. | Almost all dissolved. |

From these factors it becomes evident that my mixtures are substantially lower in pH than the tetrahydrate; they will not injure the mucous membrane and will liberate a substantially greater amount of oxygen per unit time than sodium perborate tetrahydrate; yet they will maintain a pH on the alkaline side so that the bactericidal particularly the spirochetocidal effect sufficiently manifests itself. The substance formed in solution, as chemical tests have proven, is not hydrogen peroxide but nascent oxygen, as I have discovered that between the pH range of 7.0–9.4, oxygen is formed, whereas outside these limits, either on the acid or alkaline side, the undesired hydrogen peroxide is formed. By the clause "A catalytically small amount" of an alkali metal salt of iodine or potassium iodide, I mean an amount between the minimum stated in the above specification, to wit, 0.1% to the maximum of 3% of the entire composition.

I claim:

1. A water-soluble non-hygroscopic preparation consisting of monohydrated sodium perborate as the major ingredient, sodium chloride and a catalytically small amount of potassium iodide not exceeding 3% of the whole preparation, the sodium chloride being sufficient in amount to appreciably decrease the alkalinity of the perborate.

2. A water soluble, non-hygroscopic preparation consisting of monohydrated sodium perborate in major proportion, an alkali metal salt of iodine in catalytically small amount, not exceeding 3% of the whole preparation and a substance selected from the group consisting of non-toxic acids, salts and acid salts to reduce the alkalinity to a pH between 7.0–9.4.

3. A dry free-flowing preparation consisting of substantially monohydrated sodium perborate and sodium chloride in substantially equal proportion, citric acid in proportion substantially less than either of the first named substances, and potassium iodide not substantially extending 3 percent by weight of the total preparation.

4. A dry non-hygroscopic preparation, consisting of partially dehydrated sodium perborate in major proportion, a catalytically small amount of an alkali metal salt of the group consisting of iodine and bromine, and a substance selected from the group consisting of non-toxic acids, salts and acid salts which will lower the alkalinity of the mixture to approximately a pH of 7–9.4, the said alkali metal salt not exceeding 3% of the whole preparation.

NICHOLAS M. MOLNAR.